United States Patent
Bystedt

(10) Patent No.: US 10,385,540 B2
(45) Date of Patent: Aug. 20, 2019

(54) PORTABLE POWER SUPPLY SYSTEM FOR AN ELECTRICALLY DRIVEN WORK MACHINE AND A WORK MACHINE EQUIPPED WITH SUCH A POWER SUPPLY SYSTEM

(71) Applicant: BROKK AKTIEBOLAG, Skellefteå (SE)

(72) Inventor: Gunnar Bystedt, Skellefteå (SE)

(73) Assignee: Brokk Aktiebolag, Skelleftea (SE)

( * ) Notice: Subject to any disclaimer, the term of this patent is extended or adjusted under 35 U.S.C. 154(b) by 27 days.

(21) Appl. No.: 15/643,330

(22) Filed: Jul. 6, 2017

(65) Prior Publication Data
US 2017/0306588 A1    Oct. 26, 2017

Related U.S. Application Data

(63) Continuation of application No. 14/396,682, filed as application No. PCT/SE2013/050426 on Apr. 19, 2013, now Pat. No. 9,725,879.

(30) Foreign Application Priority Data

Apr. 23, 2012 (SE) ..................... 1250399

(51) Int. Cl.
*B60W 10/00* (2006.01)
*E02F 9/20* (2006.01)
(Continued)

(52) U.S. Cl.
CPC .......... *E02F 9/2004* (2013.01); *B60L 15/20* (2013.01); *B60L 15/40* (2013.01); *E02F 3/966* (2013.01);
(Continued)

(58) Field of Classification Search
CPC ....... E02F 9/2004; E02F 9/2091; E02F 9/205; E02F 9/207; E02F 9/20; E02F 3/966;
(Continued)

(56) References Cited

U.S. PATENT DOCUMENTS

| 4,776,750 A | 10/1988 | Griswold |
| 5,293,947 A | 3/1994 | Stratton |

(Continued)

FOREIGN PATENT DOCUMENTS

| EP | 0889571 A2 | 1/1999 |
| EP | 2180576 | 4/2010 |

(Continued)

OTHER PUBLICATIONS

Observations by a third party in corresponding EP Application No. 13781548.6, dated Dec. 20, 2016.

*Primary Examiner* — James M Dolak
(74) *Attorney, Agent, or Firm* — Knobbe, Martens, Olson & Bear, LLP

(57) ABSTRACT

A portable power supply system supplies a remotely controlled, electrically driven work machine with electrical power. The work machine includes continuous tracks and is equipped with a maneuverable arm that carries a tool at its free end. An electric motor is connected to a hydraulic pump and supplies the machine with a hydraulic medium. The work machine is connected under normal operation to a primary source of power via an electrical cable. The primary source of power includes a fixed alternating current electricity distribution grid at the location. In order to be able to supply the current that is required it includes a DC energy-storage arrangement that, including a secondary source of power, can store energy and, when necessary, supply energy in electrical form. A coupling arrangement makes it possible (Continued)

to choose between connecting the motor to the primary or the secondary source of power.

13 Claims, 3 Drawing Sheets

(51) Int. Cl.
  *E02F 3/96* (2006.01)
  *B60L 15/20* (2006.01)
  *B60L 15/40* (2006.01)
  *H02P 4/00* (2006.01)

(52) U.S. Cl.
  CPC .............. *E02F 9/205* (2013.01); *E02F 9/207* (2013.01); *E02F 9/2091* (2013.01); *H02P 4/00* (2013.01); *Y02T 10/7258* (2013.01)

(58) Field of Classification Search
  CPC .......... B60L 15/20; B60L 15/40; B60L 15/42; B60L 2200/40; H02P 4/00
  See application file for complete search history.

(56) References Cited

U.S. PATENT DOCUMENTS

| | | | |
|---|---|---|---|
| 6,871,712 B2 | 3/2005 | Koch | |
| 7,890,235 B2 | 2/2011 | Self | |
| 8,125,105 B2 * | 2/2012 | Ishida | H02J 1/102 307/10.1 |
| 8,195,344 B2 | 6/2012 | Song | |
| 8,272,467 B1 | 9/2012 | Staab | |
| 8,428,791 B2 * | 4/2013 | Carlsson | E02F 9/2004 701/2 |
| 8,868,301 B2 | 10/2014 | Self | |
| 8,941,263 B2 | 1/2015 | Lee | |
| 9,086,241 B2 * | 7/2015 | Bystedt | E02F 3/3681 |
| 9,309,649 B2 | 4/2016 | Nishikawa | |
| 9,334,627 B2 | 5/2016 | Self | |
| 9,349,532 B2 | 5/2016 | Kim | |
| 9,362,797 B2 | 6/2016 | Murata | |
| 9,388,550 B2 | 7/2016 | Wei | |
| 9,421,873 B2 | 8/2016 | Ishida | |
| 9,433,979 B2 | 9/2016 | McClister | |
| 9,457,666 B2 | 10/2016 | Caldeira | |
| 9,581,176 B2 | 2/2017 | Izumi | |
| 9,605,409 B2 * | 3/2017 | Gudat | E02F 9/2045 |
| 9,725,879 B2 * | 8/2017 | Bystedt | E02F 3/966 |
| 9,975,417 B2 * | 5/2018 | Kalmbach | B60K 6/365 |
| 10,054,119 B2 * | 8/2018 | Sasaki | B60L 11/1861 |
| 10,209,739 B2 * | 2/2019 | Nessel | B60R 11/0252 |
| 2003/0048006 A1 † | 3/2003 | Shelter, Jr. | |
| 2010/0096921 A1 * | 4/2010 | Ishida | H02J 1/102 307/9.1 |
| 2010/0250160 A1 † | 9/2010 | Spitaels | |
| 2011/0291479 A1 | 1/2011 | Lee | |
| 2011/0301794 A1 | 12/2011 | Bastien | |

FOREIGN PATENT DOCUMENTS

| | | |
|---|---|---|
| EP | 2180576 A2 † | 4/2010 |
| WO | 2010085184 | 7/2010 |
| WO | 2010085184 A1 † | 7/2010 |
| WO | WO 2010/085184 A1 | 7/2010 |
| WO | 2011080392 | 7/2011 |
| WO | 2011080392 A1 † | 7/2011 |
| WO | WO 2011/080392 A1 | 7/2011 |

\* cited by examiner
† cited by third party

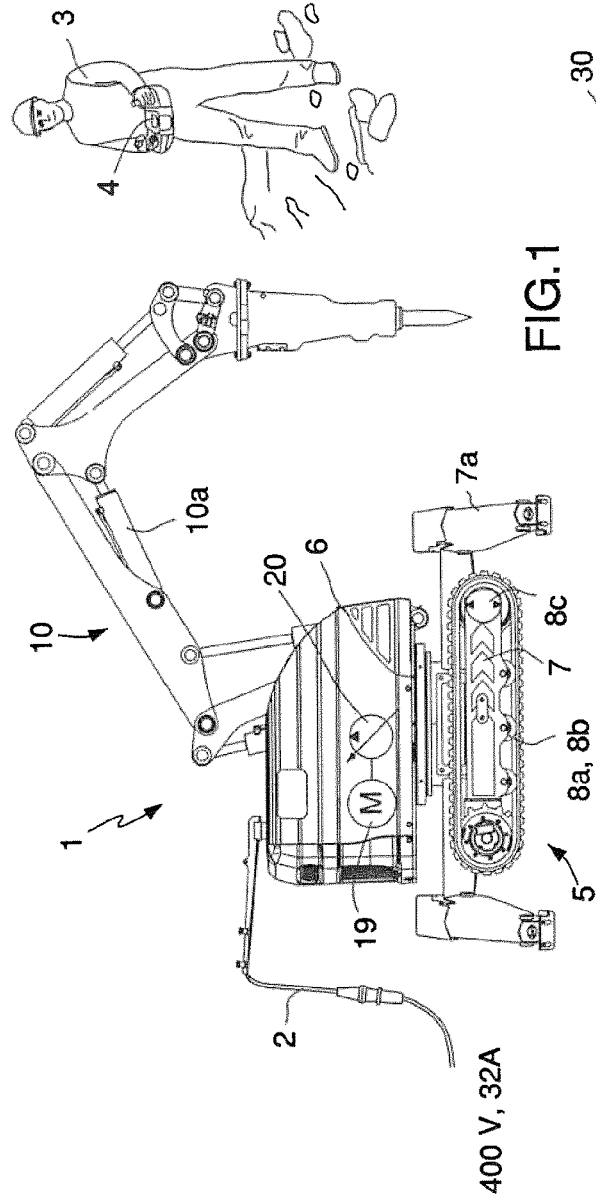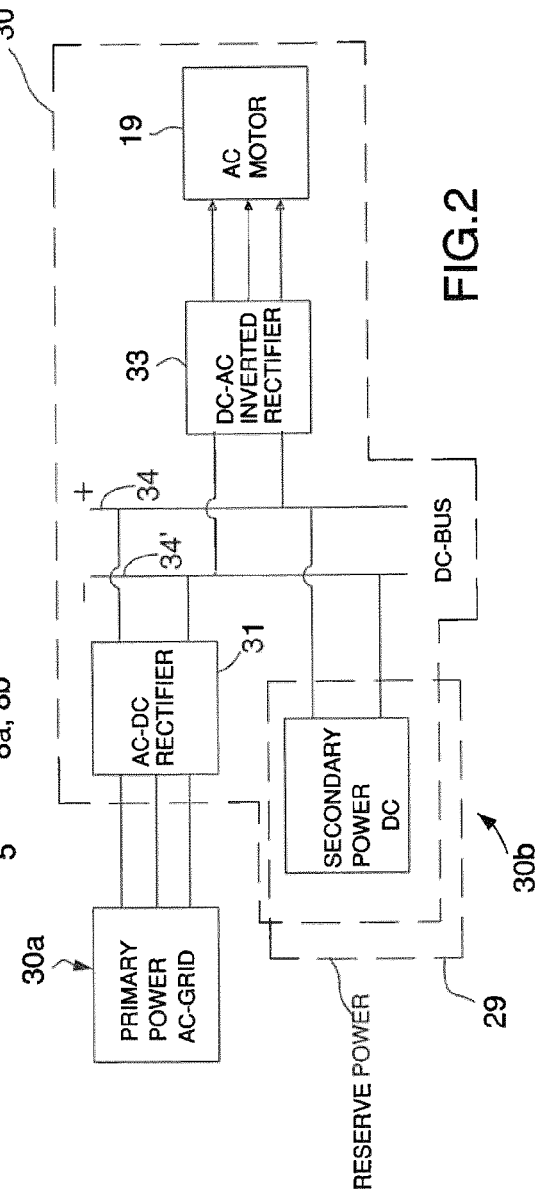

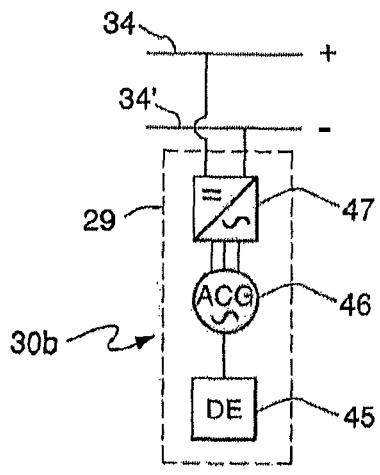
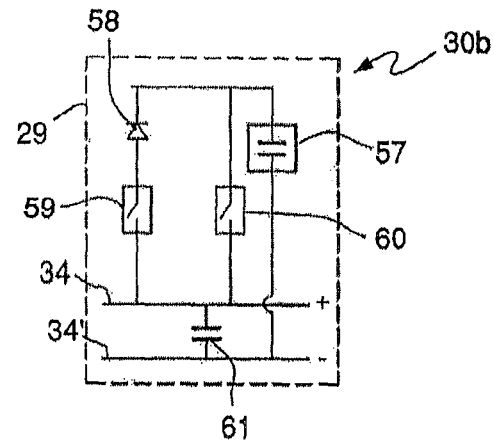
FIG.5  FIG.6
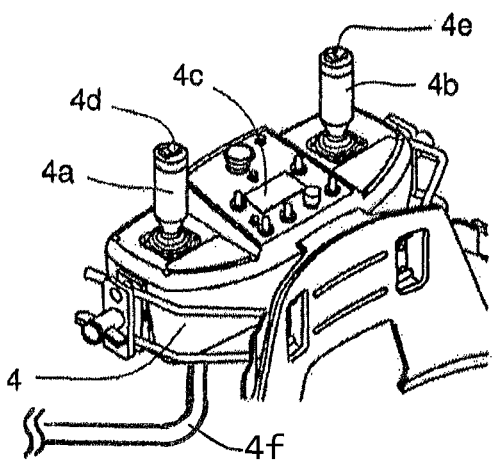
FIG.7A
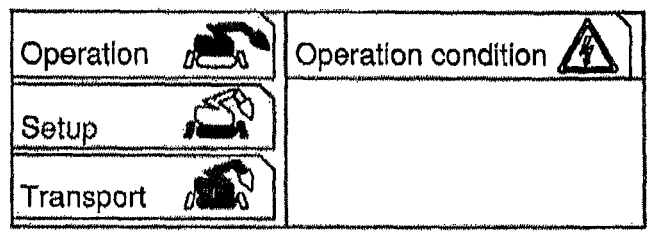
FIG.7B
Operation condition 
Reserve power  ● On

PORTABLE POWER SUPPLY SYSTEM FOR AN ELECTRICALLY DRIVEN WORK MACHINE AND A WORK MACHINE EQUIPPED WITH SUCH A POWER SUPPLY SYSTEM

CROSS-REFERENCE TO RELATED APPLICATIONS

This application is a continuation of U.S. application Ser. No. 14/396,682, filed on Oct. 23, 2014 as the U.S. National Phase under 35. U.S.C. § 371 of International Application PCT/SE2013/050426, filed Apr. 19, 2013, which claims priority to Swedish Patent Application No. SE 1250339-1, filed Apr. 23, 2012. The disclosures of the above-described applications are hereby incorporated by reference in their entirety.

FIELD

The present invention concerns a portable power supply system for an electrically driven work machine, such as a demolition robot. The invention concerns also a work machine, such as a demolition robot, equipped with such a power supply system.

BACKGROUND

When a work machine is to be taken into use at the intended location, it is not seldom that the problem arises that the location in question lacks a fixed electricity distribution grid for low voltage that can supply the required power to the work machine, i.e. the grid provides the required grid voltage, such as 400 V, but cannot supply the grid current that the work machine requires. This condition is known as "power deficit" and can arise when the available electricity distribution grid at the location can supply, for example, only a main fuse rating of 16 A while the work machine requires a higher fuse rating, for example 32 A, in order for it to be possible to use the machine. Thus, starting to use the work machine is considerably delayed or made more difficult, or in the worst case made impossible, in those cases in which the electricity distribution grid at the location cannot supply the current that the work machine requires. It should be understood that it is extremely troublesome if the work machine cannot be taken into use at the location immediately, also in those cases in which it is possible to modify or adapt the electricity distribution grid such that it is able to supply the current required to the work machine. In the worst case, it is not possible for the work machine to be driven off of the transport vehicle with which it has been transported to the relevant work location, due to the lack of the required electricity distribution grid. It should further be realised that the requirement for greater grid current and thus higher fuse rating than the rating available at the relevant location of the electricity distribution grid not only involves increases in cost as such, but also places considerably greater demands on the external electrical grid, with demands on the required conductor area, protective conductors, etc., that is to provide current to the electricity distribution grid at the location. The requirement to be able to drive and move the work machine during a limited period may, of course, also arise in the event of a sudden power failure or more extended loss of grid power.

EP 2 180 576 A2 reveals a portable power supply system for a remotely controlled electrically driven work machine. The system uses a coupling arrangement with current breakers or switches. An operator can reconnect the switches through the influence of a control arrangement such that they either connect in a primary source of power (the fixed alternating current electricity distribution grid at the location) or a secondary source of power (that may comprise a battery).

SUMMARY

A remote-controlled work machine of the present type generally includes a chassis with an upper part and a lower part. The upper part is mounted on bearings on the lower part in a manner that allows rotation, for oscillation in a horizontal plane around a vertical axis, and it supports a maneuverable arm that is provided at its end with a quick-release coupling for the support of various types of tool. The lower part of the work machine is provided with a propulsion means that includes continuous tracks. This type of work machine is intended for various types of task and for specific industrial applications, not only indoors but also outdoors. An operator walks beside the machine and controls its various movements with a control unit that is supported on the body of the operator by a harness or similar. The work machine has various types of working mode that can be selected through the control unit. The operator is in connection with the machine through the control unit by cable or in a wireless manner, for example through Bluetooth or radio control. The control unit comprises control levers and a series of button and knobs that through their influence and settings can cause the drive units and the maneuverable arm of the work machine to carry out the desired motions. The work machine is powered by electricity and is supplied with power through a power cable from a fixed electrical grid. The electrical energy is converted to hydraulic energy with the aid of an electrically driven pump device, which hydraulic energy in the form of a hydraulic medium under pressure is led to the various active units of the work machine via valves, which preferably are of the type known as "electrical hydraulic". The electric motor that is used to drive the pump device of the work machine is normally of three-phase, low-voltage type, with a rated voltage of 380-500 V and a frequency of 50 or 60 Hz. To facilitate understanding of the following, it is reminded that the energy that is transferred by hydraulic systems is calculated in general as the fluid pressure P (N/m²) multiplied by the volume of flow Q (m³/s). The hydraulic medium thus constitutes an energy carrier.

A first purpose of certain embodiments of the present invention is to achieve a portable power supply system for a remotely controlled electrically driven work machine of the type described above that eliminates the above-mentioned problems and makes it possible to immediately and in all circumstances be able to use the work machine at a work location, also in circumstances in which the relevant electricity distribution grid at the location is not able to supply the required current. This first purpose of these embodiments invention is achieved through a portable power supply system that has been given the features and characteristics that are specified in claim 1. A second purpose of embodiments of the invention is to achieve a remotely controlled work machine of the present type with significantly improved ease of use and reliability. This second purpose of these embodiments of the invention is achieved through a work machine that demonstrates the features and characteristics that are specified in claim 8.

One idea behind the invention consists in arranging for the hydraulic drive systems of the work machine the possibility to use, either in combination or individually, a primary and a secondary source of power, whereby the primary source of power includes the relevant electricity distribution grid to which it is intended that the work machine is to be connected when in operation, while the secondary source of power includes any suitable DC energy-storage device that can store energy and deliver energy in electrical form when required. In the case in which the relevant work location lacks the electricity distribution grid that is required, the secondary source of power can be connected in and serve as a supplement to the primary source of power, or alternatively, the secondary source of power is so dimensioned that it alone, and as a reserve unit, can manage to supply the electrical power that is required to the work machine, in any case during a limited period. It is appropriate that the power supply system comprise a DC bus, which makes it possible to connect and use the power in various sources of energy essentially freely, for example a battery in direct combination with a conventional AC electrical distribution grid of three-phase 400 V rating or even with simply a single-phase 230 V rating. In the event of power surplus arising in the DC bus, operation can be carried out without loss of performance at the same time as the battery that is a component of the secondary source of energy is charged by means of the surplus.

The hybrid aspect in the present electrically driven work machine lies in the possibility of being able to use a secondary or supplementary source of electrical energy, not only for the charging of batteries or as reserve power, but also for the operation of the work machine, for example as supplement to an inadequate electrical grid at the location. The secondary source of power may include a battery that is integral to the work machine, a generator that is driven by a small integral fuel engine, or an integral fuel cell that contains a fuel, for example hydrogen gas, intended to be converted to electrical energy.

BRIEF DESCRIPTION OF THE FIGURES

An embodiment of the invention will be described below in more detail with reference to the attached drawings, of which:

FIG. 1 shows a side view of a remotely controlled electrically driven work machine equipped with a portable power supply system according to invention, FIG. 2 shows schematically a block diagram of a portable power supply system that according to the invention includes an arrangement that allows not only a primary but also a secondary source of power to be connected to the work machine in order to operate the same, FIG. 5 shows a portable power supply system according to the invention in which the secondary source of power includes a generator unit driven by a diesel engine, known as a "genset", FIG. 6 shows a portable power supply system according to the invention in which the secondary source of power includes an energy-storage system that contains a supercondensor, FIG. 7A shows a perspective view from above of a control unit, such as it is seen by an operator during operation of the work machine, FIG. 7B shows in the form of a summary the functions of the control unit and symbols for setting the work machine from normal operation to an operating condition in which reserve power from a secondary source of energy is used.

DESCRIPTION

Figure 3:
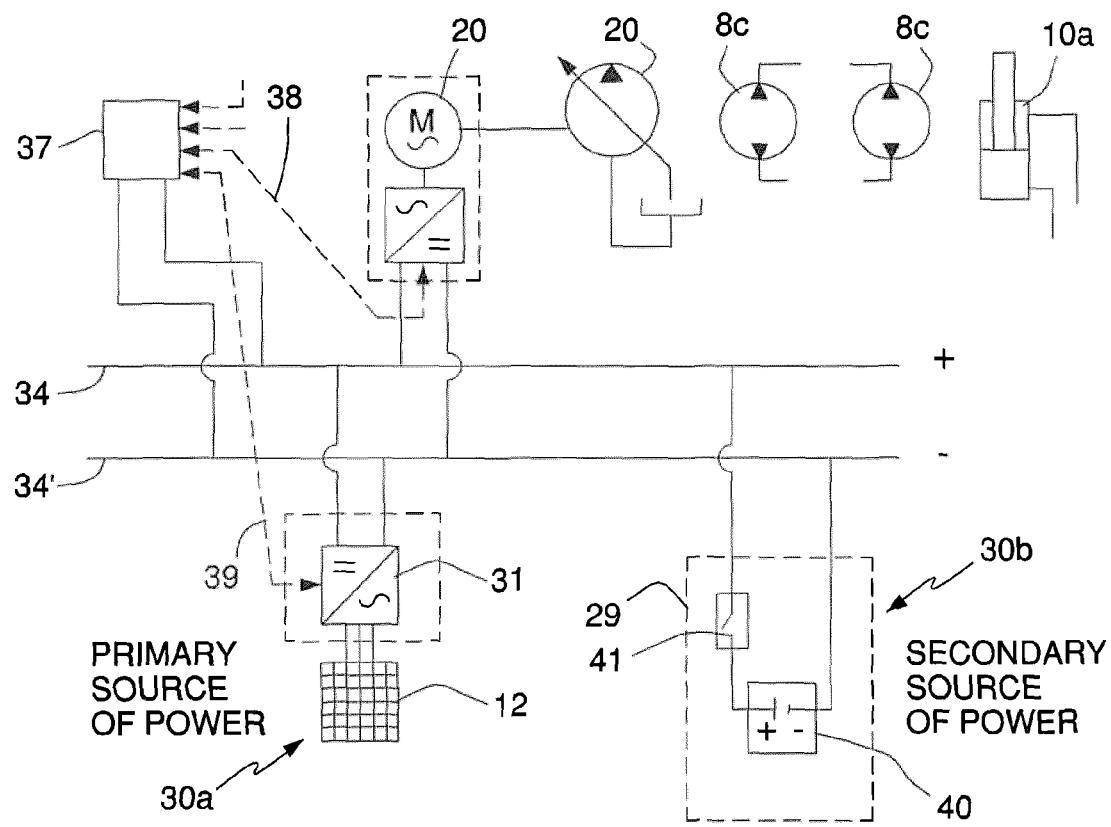
FIG. 3 shows schematically a block diagram of a portable power supply system according to the invention in a design in which the primary source of power that is used includes a conventional AC electrical distribution grid and the secondary source of power includes a source of power supported by the work machine that includes a battery.

FIG. 1 shows a remote-controlled electrically driven working machine 1 designed as a demolition robot that is supplied with power through a cable 2. The work machine requires a relatively large supply of energy and in order to be able to supply it with the electrical power that is required the electricity distribution grid normally supplies a grid current of, for example, 32 A at a voltage of 400 V. The grid is equipped with fuses in order to cope with such power requirements. A remote-controlled work machine of the present type is manufactured and sold under the trademark "BROKK", and at such a work machine an operator 3 walks beside the machine and controls and operates it by means of a portable control unit 4 or remote-control unit that is carried on the body by means of a belt or harness. The control unit 4 comprises control levers, together with buttons and knobs that through their influence and settings can cause the work machine to carry out the desired motions, or through the input of data the work machine is provided with the required instructions. Normal operational tasks are the work of tearing down and demolition, where the operator 3 can be located at a safe distance from a dangerous working area. The work machine 1 generally comprises a chassis 5 with an upper part 6 and a lower part 7. The upper part 6 is mounted to rotate in bearings on the lower part 7 for oscillation in a horizontal plane around a vertical axis C. The lower part 7 of the work machine 1 is provided with a propulsion means 8a that includes continuous tracks 8b and that makes it possible for the work machine to move on various surfaces. The continuous tracks 8b are driven by hydraulic motors 8c. The work machine, furthermore, has a number of support legs 7a. The work machine 1 has a maneuverable arm 10 that is supported at the rotatable upper part 6 and that includes, for the maneuvering of the arm, in this case four hydraulic functions that are influenced by a series of hydraulic cylinders 10a.

As is made most clear by FIGS. 1 and 7A, the operator 3 is in connection with the work machine 1 through the control unit 4 by cable 4f or in a wireless manner, for example through Bluetooth or radio control. The work machine 1 can be set through the control unit 4 into different working modes as is illustrated in FIG. 7B. The control unit 4 is set into what is known as "setup mode" during the exchange of the working mode. The working mode selected is displayed with the aid of symbols that are illuminated on a display 4c on the control unit 4. According to the present invention it is also possible to select in the said setup mode an operating condition with a supply of reserve power (secondary power), which condition can be activated and inactivated by setting its mode to "On" or "Off". In the said condition in which reserve power is used, the power supply system supplies three-phase rated voltage at 400 V and a frequency of 50 Hz AC to the electric motor of the work machine with the nominal power that is required to drive the work machine according to the specified rating. The fact that the reserve power mode has been activated, in the "On" mode, is indicated to the operator on the display 4c of the control unit 4. In an alternative design, it is, of course, possible to automate this setting, whereby the system itself detects the instantaneous power requirement, i.e. whether there is a deficit or a surplus of power, in which a control arrangement such as, for example, a PLC, a computer or similar, connects the secondary source of power in as required.

Once again with reference to FIG. 1, it is there made clear that the work machine 1 has a drive system that comprises a hydraulic system for the control of the various functions of the work machine. As the circuit diagram makes clear, the work machine 1 is equipped with an AC three-phase electric motor 19 that drives a hydraulic pump 20 with fixed displacement, and with which pump all of the operational devices of the machine are provided with hydraulic medium. Only the first hydraulic cylinder 10a of the maneuverable arm 10 is shown in this simplified embodiment. During displacement of the work machine 1 forwards or backwards, the hydraulic flow is transmitted to a relevant continuous track motor 8c through a hydraulic valve, not shown in the drawing. It should be understood that it is crucial that the required electrical power can be supplied from a source of power to the electric motor 19 of the work machine in order for it to be possible for the work machine 1 to be operated at all.

With reference to FIGS. 2 and 3 in particular, and according to the invention, a system 30 for the supply of power to the work machine 1 comprises an arrangement that makes it possible to either in combination or individually to be able to use a primary 30a and a secondary 30b source of power. The term "primary source of power" is here used to denote the fixed electricity distribution grid with a three-phase rated voltage of 400 V and a frequency of 50 Hz that is normally available at each work location and to which it is intended that the work machine 1 be connected for its operation. The term "secondary source of power" 30b is here used to denote any suitable DC energy-storage arrangement 29 that is supported by the work machine 1 and that can store energy and supply energy in electrical form when necessary. The stored energy can appear in any suitable form, for example as chemical energy (an energy cell) stored in a certain substance, electrical energy, kinetic energy, etc. A DC energy-storage arrangement may also include what is known as a "UPS" (uninterruptible power supply), the task of which is to cope with temporary and brief disturbances in the electrical grid.

The said portable power supply system 30 that can be supported as an integrated part of the work machine 1 is illustrated in FIG. 2 with a dash-dot contour line. The power supply system 30 comprises the following principal components: a rectifier 31 to convert from AC alternating current that is fed from the grid 32 to direct current, an inverted rectifier 33 in order to convert a constant direct voltage to alternating voltage, an intermediate circuit or DC bus 34, 34' that stabilizes and may also be arranged to smooth the pulsating direct voltage and whose task is to constitute a form of energy store from which the inverted rectifier obtains energy, a control circuit 35 (see FIG. 3) for the control and monitoring of the voltage levels that appear in the system by continuously sending and receiving signals from the said units and the said energy-storage arrangement 29. All of the units mentioned here are as such well known within the field of electro technology and are all commercially available, and thus their design and function will not be described in more detail.

The energy-transfer system is shown in more detail in FIG. 3 and as the drawing makes clear the DC bus has a positive side 34 and a negative side 34'. The principal power grid 12 that produces power is connected to the positive and negative sides 34, 34' of the DC bus as primary source of power 30a. The said principal power grid 12 that produces power generally includes a fixed mains power grid that is located at the site, from which is fed a three-phase alternating current with a suitable system voltage level for conventional grids, for example 400 V at frequency of 50 Hz. The alternating current is converted to a DC direct voltage by the rectifier 31 that is connected to the DC bus 34, 34' mentioned above. The three-phase AC drive motor 19 of the work machine 1, which drives the hydraulic pump 20, is also connected to the DC bus 34, 34' via the said inverted rectifier 33. The power to and from the relevant units that are connected to the DC bus 34, 34' is controlled and monitored by means of a control system 37, for example a programmable logic controller, (PLC) or a computer which is in connection with the said rectifier 31 and inverted rectifier 33 through channels 38, 39. It is appropriate that what is known as a "buck-boost circuit" or similar is used for control and monitoring of the voltage levels at the DC bus, which buck-boost circuit is for this purpose arranged between the DC bus 34, 34' and the energy-storage arrangement 29, of which the secondary source of power 30b is a part. The energy-storage arrangement 29 comprises an energy store in the form of a battery 40 of, for example, NiMh type or an electrical accumulator, the capacity of which may be freely chosen and as required. The battery 40 thus forms a secondary source of power 30b that can be recharged through connection to a source of electrical voltage. For the storage of energy and the supply of the said energy in the form of a DC direct current to the DC bus 34, 34', a switch 41 is used that can be set into alternative positions by the operator 3 by means of the control unit 4. Due to the DC bus 34, 34', there is offered the possibility of connecting in a simple manner the energy-storage arrangement 29 and the secondary source of power 30b in and out in an automated manner, through measurement of the instantaneous state of the DC bus, in order to check whether a power surplus or a power deficit is present. In the event of a power deficit, thus, the energy-storage arrangement 29 and the secondary source of power 30b are connected in and, conversely, in the event of a power surplus, the energy-storage arrangement 29 is charged by the surplus that the primary source of power 30a supplies.

An alternative design is shown in FIG. 5 in which a diesel-powered unit 45 is used as secondary source of power 30b. The diesel-powered unit 45 is mechanically connected to an AC power generator 46 in order to form what is known as a "genset". The AC alternating current that is supplied by the power generator 46 having a suitable frequency is converted to DC direct current by means of a converter 47 and is led into the DC bus through the positive 34 side and the negative side 34'.

The energy-storage arrangement 29 is shown in FIG. 6 in an alternative design comprising an energy store in the form of a supercondensor 57, in which electrical energy can be stored, whereby the supercondensor forms a secondary source of energy. In addition to the said supercondensor 57, a diode 58 and a charge switch 59 are present in a first branch, whereby the branch is connected in parallel across the positive side 34 and the negative side 34' of the DC bus. Further, a second branch is present with a switch 60 that when closed causes the supercondensor 57 to be discharged. The diode 58 allows current to pass only in a direction that leads to charging of the supercondensor 57, whereby discharge cannot take place through the said first branch, which contains the diode 58. When the first branch is closed, the voltage of the supercondensor 57 increases such that it eventually exceeds the voltage across a condensor 61 that is a component of the DC bus. Since the voltage across the supercondensor 57 is higher than the voltage across the condensor 61 of the DC bus, the supercondensor can be connected for the delivery of current to the drive motor 19 of the work machine 1 through the relevant inverted rectifier 33, which takes place in practice through the second branch being closed by means of the switch 60. Since the system works with a DC distribution grid between not only the primary but also the secondary source of power and the consumer (the AC alternating current motor 19), energy levels can be balanced in a simple manner through mutual transfer of energy between various sources of energy in the system. This is interesting in particular when it is a case of work machines of the present type, which are used not seldom at locations that lack the necessary fixed electrical infrastructure, while the primary source of power 12 needs only to supply a limited part of the power that is normally required to drive the electric motor 19 and thus to operate the work machine 1, at the same time as the remaining part of the power that is required to achieve the required level of power is obtained from the secondary source of power. One example of such a situation in which this can be an advantage is that in which the general electricity distribution grid at the location can supply only a limit grid current, such as 16 A, while the work machine requires 32 A in order for it to be operated.

Figure 4:
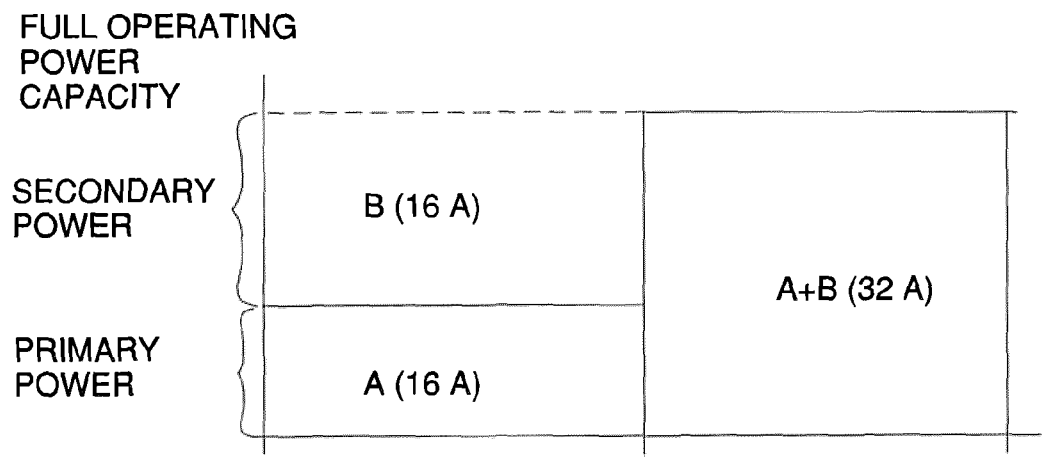
FIG. 4 shows schematically in the form of a graph the extra power that is obtained during the use of a combination of a primary and a secondary source of power.

This situation is illustrated in more detail in FIG. 4, whereby the total requirement for power for a work machine 1 is shown schematically in the form of a graph denoted by the block A+B for a grid current of 32 A. Block A corresponds to the maximal level of power that can be obtained at a grid current of 16 A, while Block B corresponds to the reserve power or supplementary power requirement that must be supplied by the secondary source of energy in order to achieve the required level of power. Sufficient power to supply the work machine is obtained due to the combination of primary power from the AC grid (16 A) and the energy-storage arrangement 29 that is supported by the work machine and that obtains power from the secondary source of energy. It should be realised that the amount of electrical power that can be obtained from the energy-storage arrangement 29, i.e. the capacity of the arrangement, depends on a number of different factors such as the technical design of the secondary source of power and its dimensions. The energy-storage arrangement 29 can, for example, be given such a design that it can manage to supply, at least for a limited time, sufficient power to at least make it possible to unload the work machine from a transport vehicle or solely to withdraw the same such that it does not obstruct other activities. The energy-storage arrangement and the secondary source of power are charged by the DC bus as soon as the power-transfer system 30 is connected to a primary source of power 30a.

FIG. 7A shows how the work machine can be set into different working modes through the control unit 4, and this is shown also in FIG. 7B wherein it is shown with symbols into which working mode the machine has been set. With the work machine 1 set into the position for mode selection of operating the work machine 1 by "Reserve power", the symbol for selection of "Operating Condition" is displayed, whereby the display 4c is illuminated, and on activation of the function in its "On" mode, this is indicated of the display 4c of the control unit 4. Due to the possibility for the operator to set the operating condition of the work machine to the use of secondary power directly by means of the control unit, not only the problems of inadequate electricity distribution grids but also cases in which the AC grid at the location is inadequate and cannot manage to supply the current required or is temporarily absent due to a power failure. When the work machine is to be taken into use at the intended location, it is not seldom that the problem arises that the location in question lacks an electricity distribution grid for low voltage that can supply the required power to the work machine, i.e. the grid provides the required grid voltage, such as 400 V, but cannot supply the grid current that the work machine requires. For example, it is not seldom that the problem arises that the available electricity distribution grid at the location is limited in that it offers only 16 A as main fuse rating, while the work machine requires a higher fuse rating, for example 32 A or more, in order for it to be operated. Thus, starting to use the work machine is considerably delayed or made more difficult, or in the worst case made impossible, in those cases in which the electricity distribution grid at the location is assessed, quite simply, to be unable to supply the current required. These problems are solved through the power supply system described above.

The present invention is not limited to that which has been described above and shown in the drawings: it can be changed and modified in several different ways within the scope of the innovative concept defined by the attached patent claims.

What is claimed is:

1. A portable power supply system for an electrically driven demolition robot, the electrically driven demolition robot comprising a propulsion means with continuous tracks with which the demolition robot can be driven, a maneuverable arm and a coupling tool at a free end of said maneuverable arm, wherein the electrically driven demolition robot is connected to a primary source of power during normal operation via an electrical cable and said primary source of power including a fixed alternating current (AC) electricity distribution grid at a job site, the portable power supply system comprising:
   an electric motor connected to a hydraulic pump to supply the operating means of the demolition robot with a hydraulic medium,
   a secondary source of power comprising a direct current (DC) energy-storage arrangement with the ability to store and to supply electrical energy,
   a rectifier for the conversion of AC from the fixed electricity distribution grid at the job site to DC for the energy-storage arrangement, and
   a coupling arrangement arranged between the primary source of power, the secondary source of power and the electric motor such that said coupling arrangement allows the secondary source of power to be connected to the electric motor in order to drive the electrically driven demolition robot, as needed,
   wherein the coupling arrangement comprises a DC bus to which the rectifier is connected in order to supply DC from the primary source of power to the DC bus, a control circuit which is connected to the DC bus and controls and monitors the levels of voltage that are supplied from the DC bus to the electric motor through continuously sending and receiving signals from the rectifier, an inverted rectifier, and the secondary source of power that are connected to the DC bus, and further measures the instantaneous state of the DC bus,
   wherein the secondary source of power can solely supply the electrical power that is required to the demolition robot in the absence of power from the primary source of power, and can also serve as a supplemental source of power to the primary source of power to operate the demolition robot as needed.

2. The portable power supply system according to claim 1, wherein the electric motor is of three-phase alternating current type and the coupling arrangement comprises the inverted rectifier in order to reform the DC that is supplied via the control circuit from the DC bus to AC for said three-phase alternating current motor.

3. The portable power supply system according to claim 1, wherein the DC energy-storage arrangement is designed as an integral part of the demolition robot.

4. The portable power supply system according to claim 1, wherein setting of the electrically driven demolition robot for operation by means of the secondary source of power can be carried out manually by an operator through the setting of a switch or button or automatically through the measurement and recording, by means of the control circuit, of the power surplus or power deficit that arises in the DC bus of the coupling arrangement.

5. The portable power supply system according to claim 2, wherein, when set into the operating condition in which reserve power is used that includes electrical energy from the secondary source of power, the system is arranged to supply a three-phase rated voltage at 400 V and a frequency of 50 Hz AC to the electric motor of the electrically driven demolition robot with the nominal power that is required to drive the electrically driven demolition robot according to the specified rating.

6. The portable power supply system according to claim 1, wherein the DC energy-storage arrangement with the integral secondary source of power comprises at least one of a battery or an electrical accumulator.

7. The portable power supply system according to claim 1, further comprising a control unit to be carried by an operator who walks beside the electrically driven demolition robot and controls various motions of said electrically driven demolition robot in a wireless manner through radio control or through a cable,
wherein the control unit can be switched between an operating condition for an addition of back-up power which is the secondary source of power, in which the operating condition is in an active condition that is indicated to the operator with the aid of a symbol labeled "On" which is illuminated on a display on the control unit, and an operating condition in which the power supply system is arranged to supply a rated voltage to the electric motor of the demolition robot with the nominal power that is required in order to drive the motor of the demolition robot according to the specified rating.

8. An electrically driven demolition robot comprising:
a chassis with a propulsion means including continuous tracks,
a control unit to be carried by an operator who walks beside the electrically driven demolition robot and controls various motions of said electrically driven demolition robot in a wireless manner by radio control or through a cable,
a maneuverable arm coupling a tool at a free end of said maneuverable arm,
a power supply system supported by the chassis comprising an electric motor connected to a hydraulic pump to supply the operating means of the demolition robot with a hydraulic medium,
a primary source of power to which the demolition robot is connected during normal operation via an electrical cable and said primary source of power including a fixed alternating current (AC) electricity distribution grid at a job site,
a secondary source of power comprising a direct current (DC) energy-storage arrangement with the ability to store and to supply electrical energy,
a rectifier for the conversion of AC from the fixed electricity distribution grid at the job site to DC for the energy-storage arrangement,
a coupling arrangement arranged between the primary source of power, the secondary source of power and the electric motor such that the coupling arrangement allows the secondary source of power to be connected to the electric motor in order to drive the electrically driven demolition robot, as needed,
wherein the coupling arrangement comprises a DC bus to which the rectifier is connected in order to supply DC from the primary source of power to the DC bus, a control circuit which is connected to the DC bus and controls and monitors the levels of voltage that are supplied from the DC bus to the electric motor through continuously sending and receiving signals from the rectifier, an inverted rectifier, and the secondary source of power that are connected to the DC bus, and further measures the instantaneous state of the DC bus,
the control unit can be switched between an operating condition for an addition of back-up power which is the secondary source of power, in which the operating condition is in an active condition that is indicated to the operator with the aid of a symbol labeled "On" which is illuminated on a display on the control unit, and an operating condition in which the power supply system is arranged to supply a rated voltage to the electric motor of the demolition robot with the nominal power that is required in order to drive the motor of the demolition robot according to the specified rating, and
the secondary source of power can solely supply the electrical power that is required to the demolition robot in the absence of power from the primary source of power, and can also serve as a supplemental source of power to the primary source of power to operate the demolition robot as needed.

9. The electrically driven demolition robot according to claim 8, wherein the electric motor is of three-phase alternating current type and the coupling arrangement comprises the inverted rectifier in order to reform the DC that is supplied via the control circuit from the DC bus to AC for the three-phase alternating current motor.

10. The portable power supply system according to claim 1, wherein the fixed alternating current electricity distribution grid is rated a voltage of 400V and a frequency of 50 Hz.

11. The electrically driven demolition robot according to claim 8, wherein the fixed alternating current electricity distribution grid is rated a voltage of 400V and a frequency of 50 Hz.

12. The portable power supply system according to claim 1, wherein the control circuit is configured to store power in the secondary source of power when the voltage exceeds an amount of power required to operate the demolition robot and draws power from the secondary source of power when the voltage is below said amount of power.

13. The electrically driven demolition robot according to claim 8, wherein the control circuit is configured to store power in the secondary source of power when the voltage exceeds an amount of power required to operate the demolition robot and draws power from the secondary source of power when the voltage is below said amount of power.

* * * * *